United States Patent
Linn et al.

(10) Patent No.: US 8,060,860 B2
(45) Date of Patent: Nov. 15, 2011

(54) SECURITY METHODS AND SYSTEMS

(75) Inventors: Christopher Scott Linn, Palo Alto, CA (US); Darin Benjamin Adler, Los Gatos, CA (US); Donald Dale Melton, San Carlos, CA (US); Christopher Blumenberg, San Francisco, CA (US)

(73) Assignee: Apple Inc., Cupertino, CA (US)

(*) Notice: Subject to any disclaimer, the term of this patent is extended or adjusted under 35 U.S.C. 154(b) by 1283 days.

(21) Appl. No.: 11/112,152

(22) Filed: Apr. 22, 2005

(65) Prior Publication Data
US 2006/0242712 A1 Oct. 26, 2006

(51) Int. Cl.
*G06F 9/44* (2006.01)
*G06F 9/445* (2006.01)

(52) U.S. Cl. ......... 717/115; 717/125; 717/168; 717/178

(58) Field of Classification Search .................. None
See application file for complete search history.

(56) References Cited

U.S. PATENT DOCUMENTS

| | | | |
|---|---|---|---|
| 6,930,984 B1 * | 8/2005 | Nomura et al. | 370/254 |
| 7,188,085 B2 * | 3/2007 | Pelletier | 705/50 |
| 7,437,763 B2 * | 10/2008 | Guo | 726/25 |

* cited by examiner

*Primary Examiner* — Chuck Kendall
(74) *Attorney, Agent, or Firm* — Blakely, Sokoloff, Taylor & Zafman LLP (57) ABSTRACT

The present invention describes methods for improving security when accessing applications and other executable programs. In one exemplary method, a user is warned if an application that has never been previously run is being launched by the user. Other methods, as well as data processing systems and machine readable media, are also described.

39 Claims, 8 Drawing Sheets

| 1001 Safe | 1002 Archive | 1003 Executable | 1004 Unknown |
|---|---|---|---|
| .jpeg<br>.giff<br>.mov<br>.txt<br>.pdf | .gzip<br>.compress<br>.tar<br>.dmg<br>.Z<br>.sit | appications<br>Plug-ins<br>scripts<br>kernel extensions<br>widgets | unknown<br>file types |
| | ↑<br>possibly unsafe | ↑<br>unsafe | 1000 |

Fig. 10

SECURITY METHODS AND SYSTEMS

FIELD OF THE INVENTION

The present invention generally relates to methods to improve security when accessing application programs. More specifically, the present invention relates to methods to improve user security when downloading and launching applications that are potentially unsafe.

BACKGROUND OF THE INVENTION

It is nowadays commonplace for computer users to download applications or other executable programs from the Internet or other networks or sources with the intent of installing and running them in their computers. Although many such downloads come from trusted sources, executable programs originating from the Internet—or other sources where no significant security mechanism operates—can raise serious security concerns. In particularly malicious attacks, programs can be automatically downloaded and launched without the user's consent or knowledge, by simply visiting a website or clicking on a link embedded in an email, instant message or other electronic document. Once downloaded, a malicious program can associate itself with certain file types and wait until it is selected to process those files. When executed, the malicious program can cause considerable and permanent damage by deleting user files, stealing sensitive information, overwhelming operation of the CPU, spreading viruses, launching timed attacks on specific websites, etc. Clearly, a need exists to protect the vulnerability of users to such grave security breaches. Such considerations, however, must be tempered with a need to neither overly restrict users nor overburden them with warnings to the point of causing user fatigue. The present invention provides a solution that addresses both requirements.

SUMMARY OF THE DESCRIPTION

To counteract potential security problems arising from downloading and launching malicious applications or executable programs (particularly those originating from possibly unsafe sources such as the Internet), the present invention proposes, in preferred embodiments, displaying warnings for a targeted category of applications prior to download and first-time launching. In one aspect of the invention, warnings are restricted to a category of applications, executable programs or archived files deemed to be high-risk as based on simple analysis. Restricting the warnings to high-risk categories of files reduces the likelihood of user fatigue. For example, in one embodiment of the invention, a warning is displayed prior to launching an application only if the application: 1) was never launched before by the user; 2) not explicitly chosen by the user (e.g. it was selected by the operating system from a configuration file when the user double-clicked on a document); and 3) originally downloaded from the Internet.

In one aspect of the invention, the operating system maintains a per-user system-wide history of applications and programs previously run by the user. Such a list is used by the operating system to determine if an application has been run before by the user.

In yet another aspect of the invention, the visual appearance of applications and executable programs deemed potentially untrustworthy (for example, those not yet run and originating form the Internet) is modified, for example, with cautionary markings, to passively alert the user. Because the icon and, name and extension for a file are controlled by the file itself and not the operating system, a malicious program can masquerade as a trusted file type by selecting an icon and name that hides its true nature. Cautionary markings attached to potentially unsafe files serve to alert the user that the file is indeed an executable program and that it may be unsafe to run. Another aspect of the invention involves associating cautionary markings to any files that, when opened, cause an application to be launched for the first time. In one embodiment of the invention, adding cautionary markings to unsafe applications and/or to files opened by unsafe applications can serve as an alternative to the first-launch warnings previously described. Cautionary markings provide a less intrusive means of alerting users than the active display of a warning and could lessen user fatigue.

In a further aspect of the present invention, a warning is displayed to the user prior to the download of an application that comes from a source that is deemed potentially risky. In one possible embodiment, such sources may include Internet downloads but exclude executable programs and archived files installed via root or administrator privilege. In another aspect of the invention, the user is likewise warned if an application that has just been downloaded initiates a launch without the user specifically requesting so. Such a warning messages may protect the user from particularly sophisticated attacks that will automatically launch a malicious program after it is downloaded.

In another aspect of the invention, archived files (such as disk images) being downloaded are analyzed to determine if any executables are part of the archive. The analysis could involve, for example, expanding the contents and looking at the raw data bits of every component file. If any executable is included in the archive, a warning alert is displayed, allowing the user to halt the download operation.

In yet another aspect of the invention, to further reduce the likelihood of user fatigue, the user can narrow down or select the type of warnings to be issued.

BRIEF DESCRIPTION OF THE DRAWINGS

The following invention is described by way of example and not limitation on the figures of the accompanying drawings in which like references indicate similar elements.

DETAILED DESCRIPTION

The subject of the invention will be described with reference to numerous details and accompanying drawings set forth below. The following description and drawings are illustrative of the invention and are not to be construed as limiting the invention. Numerous specific details are described to provide a thorough understanding of the present invention. However, in certain instances, well known or conventional details are not described in order to not unnecessarily obscure the present invention. It will be apparent to one skilled in the art that the present invention may be practiced without these specific details.

Figure 1:
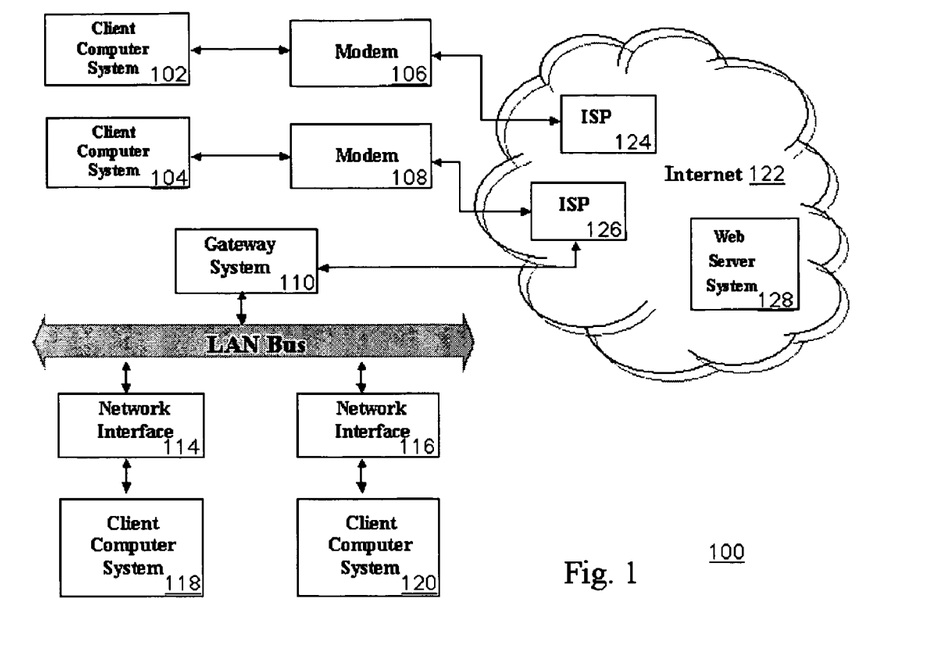
FIG. 1 is a block diagram of a network of computer systems in which web pages, from which an application program can be downloaded, may be accessed via a web browser.

FIG. 1 is a diagram of a network computer system which may be used according to one embodiment of the present invention. As shown in FIG. 1, a network 100 includes a number of client computer systems that are coupled together through an Internet 122. It will be appreciated that the term "Internet" refers to a network of networks. Such networks may use a variety of protocols for exchange of information, such as TCP/IP, ATM, SNA, SDI, etc. The physical connections of the Internet and the protocols and communication procedures of the Internet are well known to those in the art. It will be also appreciated that such system may be implemented in an Intranet within an organization.

Access to the Internet 122 is typically provided by Internet service providers (ISPs), such as the ISP 124, and the ISP 126. Users on client systems, such as the client computer systems 102, 104, 118, and 120, generally obtain access to the Internet through Internet service providers, such as ISPs 124 and 126. Access to the Internet may facilitate transfer of information (e.g., email, text files, media files, etc.) between two or more digital processing systems, such as the client computer systems 102, 104, 118, and 120 and/or a Web server system 128. For example, one or more of the client computer systems 102, 104, 118, and 120 and/or the Web server 128 may provide document presentations (e.g., a Web page) to another one or more of the client computer systems 102, 104, 118, and 120 and/or Web server 128. For example, in one embodiment of the invention, one or more client computer systems 102, 104, 118, and 120 may request to access a document that may be stored at a remote location, such as the Web server 128. In the case of remote storage, the data may be transferred as a file (e.g., download) and then displayed (e.g., in a window of a browser) after transferring the file. In another embodiment, the document presentation may be stored locally at the client computer systems 102, 104, 118, and/or 120. In the case of local storage, the client system may retrieve and display the document via an application, such as a word processing application. Without requiring a network connection.

The Web server 128 typically includes at least one computer system to operate with one or more data communication protocols, such as the protocols of the World Wide Web, and as such, is typically coupled to the Internet 122. Optionally, the Web server 128 may be part of an ISP which may provide access to the Internet and/or other network(s) for client computer systems. The client computer systems 102, 104, 118, and 120 may each, with appropriate Web browsing software, access data, such as HTML documents (e.g., Web pages), which may be provided by the Web server 128.

The ISP 124 provides Internet connectivity to the client computer system 102 via a modem interface 106, which may be considered as part of the client computer system 102. The client computer systems 102, 104, 118, and 120 may be a conventional data processing system, such as a Power Mac G4 or iMac computer available from Apple Computer, Inc., a "network" computer, a handheld/portable computer, a cell phone with data processing capabilities, a Web TV system, or other types of digital processing systems (e.g., a personal digital assistant (PDA)).

Similarly, the ISP 126 provides Internet connectivity for the client computer systems 102, 104, 118, and 120. However, as depicted in FIG. 1, such connectivity may vary between various client computer systems, such as the client computer systems 102, 104, 118, and 120. For example, as shown in FIG. 1, the client computer system 104 is coupled to the ISP 126 through a modem interface 108, while the client computer systems 118 and 120 are part of a local area network (LAN). The interfaces 106 and 108, shown as modems 106 and 108, respectively, may represent an analog modem, an ISDN modem, a DSL modem, a cable modem, a wireless interface, or other interface for coupling a digital processing system, such as a client computer system, to another digital processing system. The client computer systems 118 and 120 are coupled to a LAN bus 112 through network interfaces 114 and 116, respectively. The network interface 114 and 116 may be an Ethernet-type, asynchronous transfer mode (ATM), or other type of network interface. The LAN bus is also coupled to a gateway digital processing system 110, which may provide firewall and other Internet-related services for a LAN. The gateway digital processing system 110, in turn, is coupled to the ISP 126 to provide Internet connectivity to the client computer systems 118 and 120. The gateway digital processing system 110 may, for example, include a conventional server computer system. Similarly, the Web server 128 may, for example, include a conventional server computer system.

Figure 2:
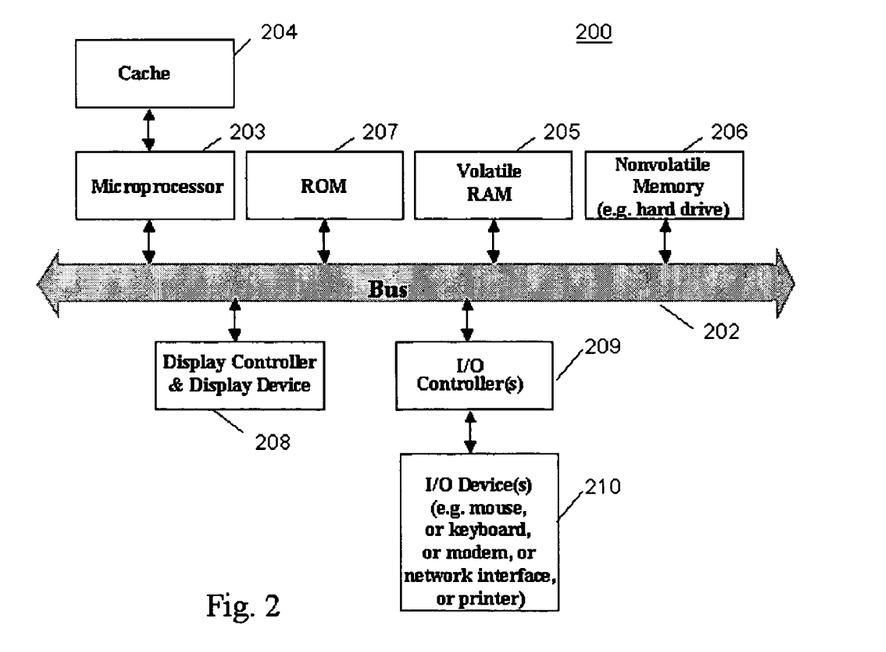
FIG. 2 is a block diagram of a digital processing system which may be used to access a web page via a web browser.

FIG. 2 is a block diagram of a digital processing system which may be used with one embodiment of the invention. For example, the system 200 shown in FIG. 2 may be used as a client computer system (e.g., the client computer systems 102, 104, 118, and/or 120), a Web server system (e.g., the Web server system 128), or a conventional server system, etc. Furthermore, the digital processing system 200 may be used to perform one or more functions of an Internet service provider, such as the ISP 124 and 126.

Note that while FIG. 2 illustrates various components of a computer system, it is not intended to represent any particular architecture or manner of interconnecting the components, as such details are not germane to the present invention. It will also be appreciated that network computers, handheld computers, cell phones, and other data processing systems which have fewer components or perhaps more components may also be used with the present invention. The computer system of FIG. 2 may, for example, be an Apple Macintosh computer.

As shown in FIG. 2, the computer system 200, which is a form of a data processing system, includes a bus 202 which is coupled to a microprocessor 203 and a ROM 207, a volatile RAM 205, and a non-volatile memory 206. The microprocessor 203, which may be a PowerPC G3 or PowerPC G4 microprocessor from Motorola, Inc. or IBM, is coupled to cache memory 204 as shown in the example of FIG. 2. The bus 202 interconnects these various components together and also interconnects these components 203, 207, 205, and 206 to a display controller and display device 208, as well as to input/output (I/O) devices 210, which may be mice, keyboards, modems, network interfaces, printers, and other devices which are well-known in the art. Typically, the input/output devices 210 are coupled to the system through input/output controllers 209. The volatile RAM 205 is typically implemented as dynamic RAM (DRAM) which requires power continuously in order to refresh or maintain the data in the memory. The non-volatile memory 206 is typically a magnetic hard drive, a magnetic optical drive, an optical drive, or a DVD RAM or other type of memory system which maintains data even after power is removed from the system. Typically the non-volatile memory will also be a random access memory, although this is not required. While FIG. 2 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 202 may include one or more buses connected to each other through various bridges, controllers, and/or adapters, as is well-known in the art. In one embodiment, the I/O controller 209 includes a USB (Universal Serial Bus) adapter for controlling USB peripherals.

Launch Warnings

Figure 3:
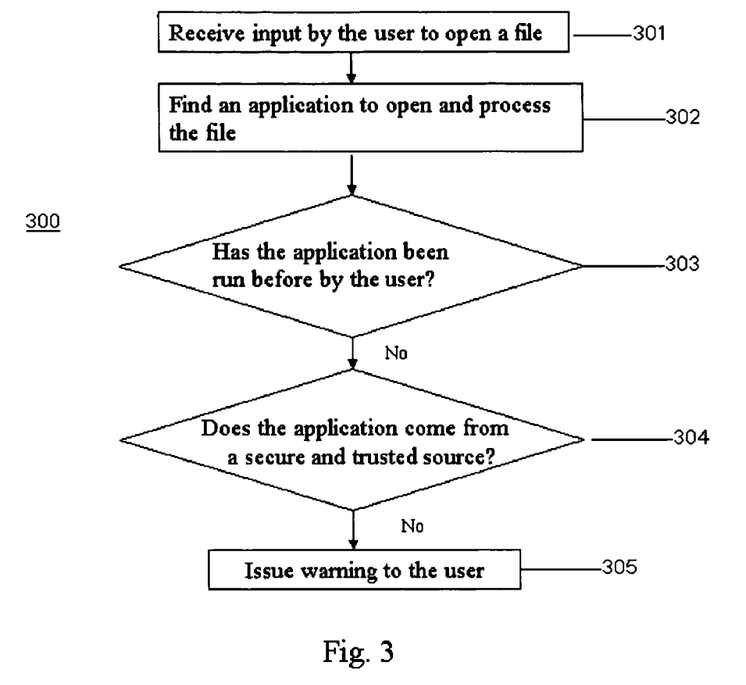
FIG. 3 is a flowchart illustrating the steps to determine if a user should be warned during an application launch.

In a preferred embodiment of the invention, the system will generate a launch warning (usually and preferably before the application is allowed to be launched) when the user requests that a file be opened but does not explicitly select the application to open the file (in which case, the operating system will select it for the user or present the user with a list of candidate applications) and when the application that opens the file has not been run before. Thus, in order to alleviate user fatigue, in certain preferred embodiments the launch warning is limited to the first time an application is run; it does not apply (in certain preferred embodiments) when the user looks for and specifically selects the application by, for example, double clicking on it, and further, the warning does not apply (in certain preferred embodiments) to applications installed via root or administrator privilege. FIG. 3 illustrates a possible series of steps involved in generating such a first-launch warning. Once the user requests to open the file 301, the operating system finds an application to open the file 302. Before opening the file, the system checks if the application has been run before 303. If it has not, the system then checks if the application originated from a trusted source (for example, if it was installed by root) 304. If it is not, then a warning is displayed 305, normally before launching the application.

The foregoing example may be considered to be an embodiment in which the warning occurs only the first time that the application is launched rather than (as in an alternative embodiment) each time the application is launched up to the nth time since the first launching, where n may be a reasonable number (e.g. n=2 or 3). In such an alternative embodiment, the warning may be given each time the application is launched up to the nth time after the first launching. For example, if n=4, then the warning is presented for the first launching and also the second and third launchings, and thereafter, the warnings are no longer presented. The value of n may be set by a user (e.g. in a system preference) or set automatically by the system (e.g. the system may ask the user whether the user is a novice or experienced user and set n higher for a novice than a setting of n for an experienced user). The presentation of the warnings may alternatively be based on the amount of time lapsed between launchings. For example, if a time lapsed between launchings of an application exceeds a period of time (e.g., 2 years) then a warning may be presented.

Figure 5A:
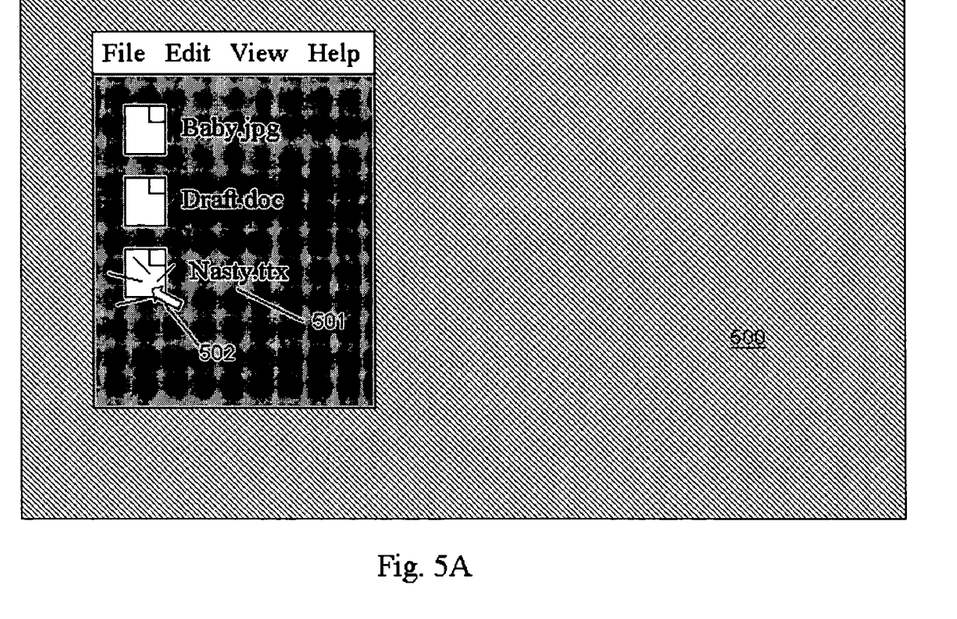
FIG. 5A-B illustrate an exemplary case where a user attempts to open a file whose type is handled by an application that has not been run before by the user and that triggers a warning.
Figure 5B:
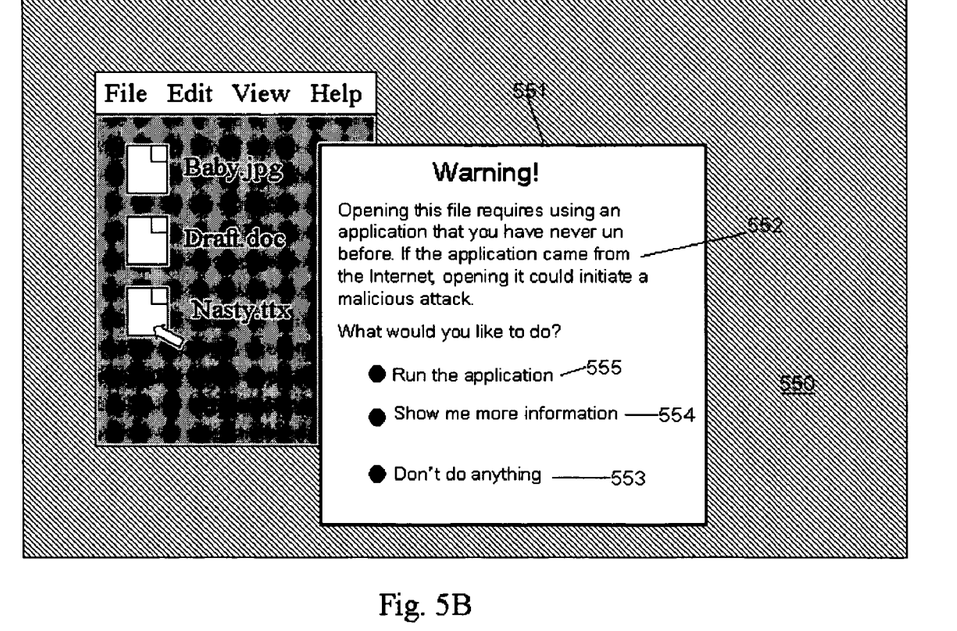

FIG. 5A shows an exemplary case where a user attempts to open a file 501 by double-clicking on it 502. Typically, the OS will either automatically open the file by selecting the application that can process the file, or in the case where many applications can do the job, by selecting the application designated as the default. Alternatively, the OS will display a list of candidate applications and allow the user to select the desired one. In the example shown in FIG. 5A, the file type is handled only by an application that has not been run previously by the user. The system duly generates a warning 551 as shown in FIG. 5B. In this example, the warning alerts the user to the fact that the application about to open the file may not be a familiar one expected by the user 552. In the case shown in FIGS. 5A and 5B, the file named Nasty.ttx 501 has the extension ".ttx", which is similar to the familiar .txt extension of plain text files. The .ttx extension could have been deliberately chosen to fool the user into thinking that a familiar application (such as Microsoft Word) would be used to open Nasty.ttx. The display of the warnings is also accompanied by a series of choices such as: halting the application 553, receiving more information about the application (such as metadata) 554, or running the application nonetheless 555.

In a further aspect of the invention, the user can select to narrow down the scope of the launch warnings (for example, by not allowing warnings for applications launched from certain folders in the system). The user may narrow the scope at any time, by for example, editing the system or security settings. Similarly, every time a warning is displayed, the user can be presented with the option to edit the warnings parameters.

Figure 4:
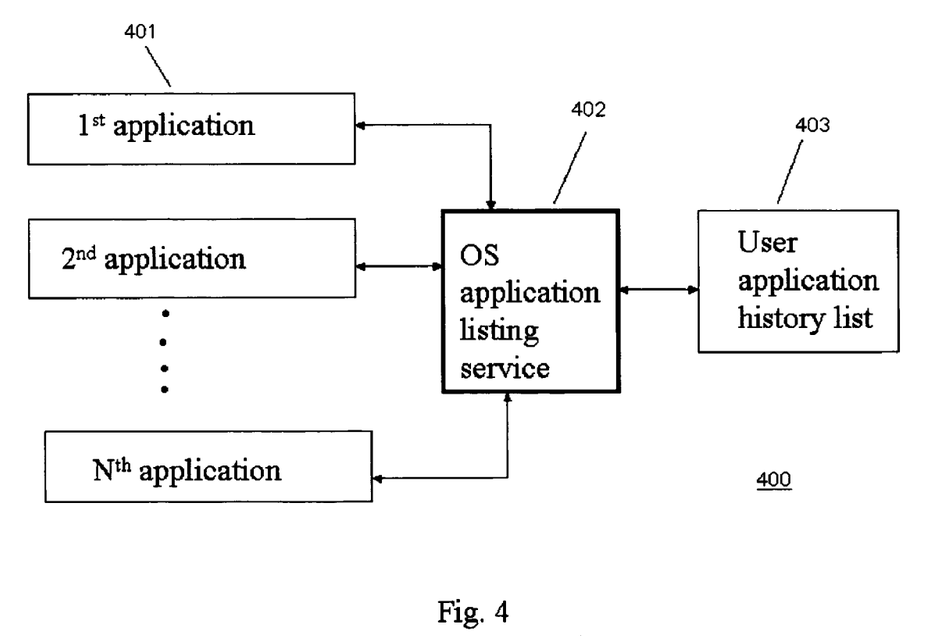
FIG. 4 illustrates an operating system applications listing service that takes care of searching and receiving the identity of all applications run so far by a user and then and sending them to a per-user history list.

In another aspect of the invention, in order to determine if an application has been run before by a user, the operating system (OS) maintains a per-user history list 403 storing the applications that have been run by each particular user, as shown in FIG. 4. Applications 401 could either report to an OS listing service 402 when they have been run or the OS could determine that information. In those embodiments in which a warning is presented up to the nth launching, the user application history stores the number of times, up to at least the nth launching, that an application has been launched.

Cautionary Markings

Figure 9A:
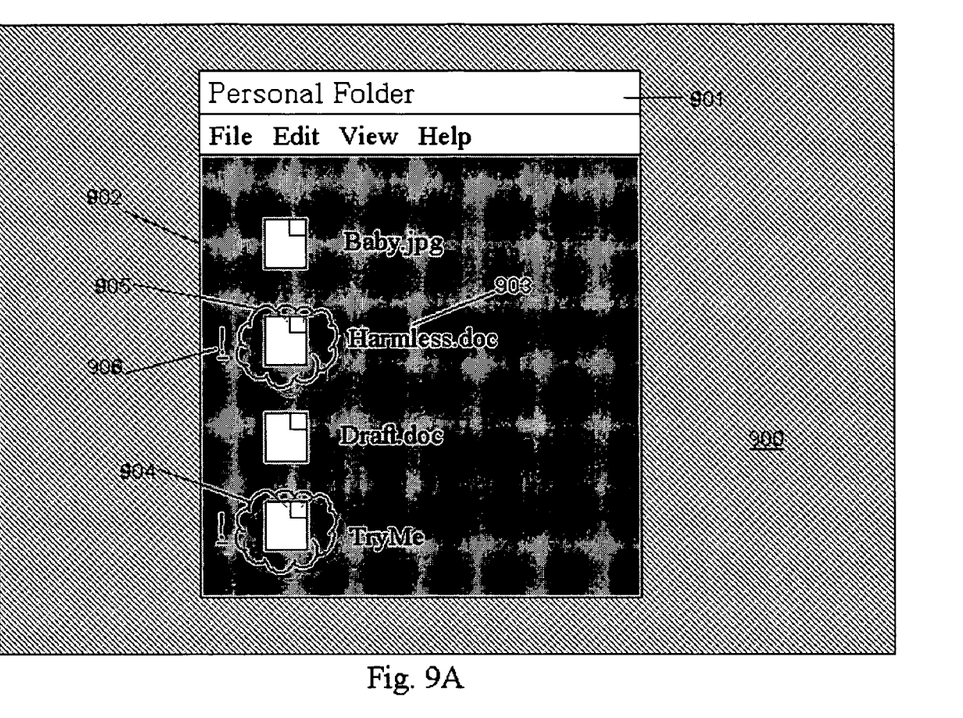
FIGS. 9A-C illustrate possible warning markings that can be added to potentially malicious executable programs to alert the user before opening them.
Figure 9B:
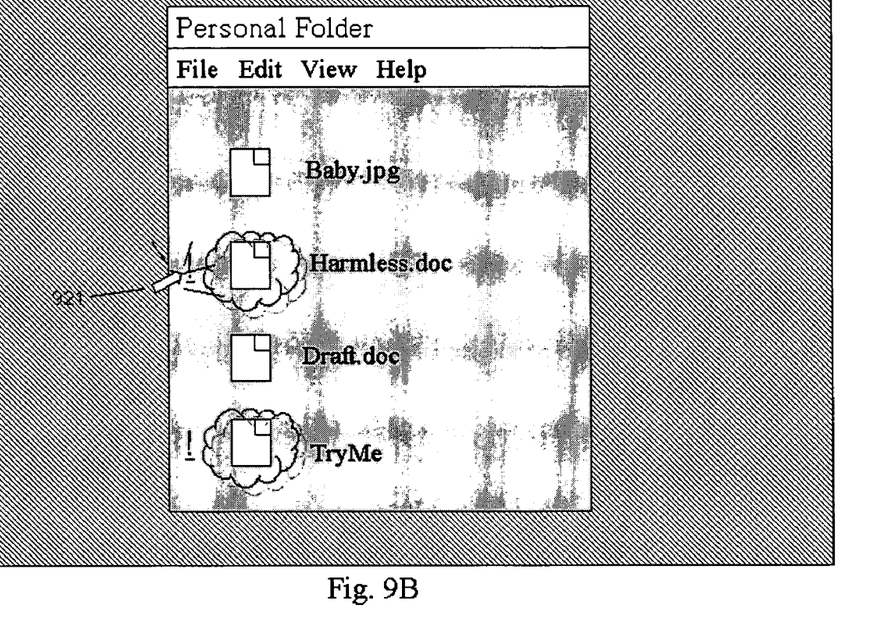
Figure 9C:
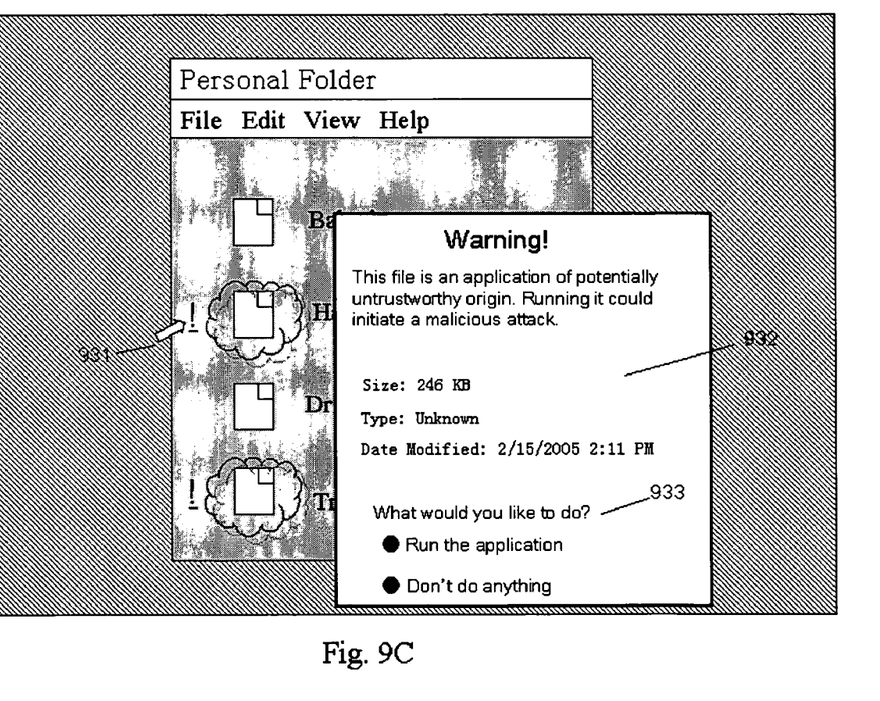

In yet a further aspect of the invention, applications and executable programs deemed potentially unsafe are visually marked in a unique, cautionary manner to alert the user, for instance, when displaying an unsafe applications' icon and/or name. Because the icon, name and extension of a file are controlled by the original source of the file and not the operating system, a malicious program can masquerade as a trusted application or document type by selecting an icon and name that conceals its true nature. The cautionary markings serve to alert the user that the file is indeed an executable program and that it has not been run before. FIG. 9A illustrates an example of a Desktop GUI where the user has opened a folder called "Personal Folder" 901 and displayed its contents in icon format 902. two of the displayed files, named "Harmless.doc" 903 and "TryMe" 904 have been marked with a "cloud" 905 around their icons and an exclamation mark 906 that, if selected, provides further information. As shown in FIG. 9B, the user has chosen to open Harmless.doc 903 by double-clicking 951. The file Harmless.doc 903 has the appearance of a regular Microsoft Word file because its .doc filename extension and file-like icon. However, the cloud marking 904 that has been added around its icon alerts the user to the fact that Harmless.doc is in fact an executable program, and that double clicking on its icon will not launch Microsoft Word but a new, potentially malicious application. In other embodiments of this feature, the marking may be a universal caution symbol (a triangle containing an exclamation point), a halo, or other symbols or other indications (e.g. flashing) or a spoken warning when a user moves a cursor over an icon. The indications or presentations may be constantly present or they may be presented only when the system determines that a user is interested in a file or document. For example, when the user causes a cursor to appear near the file or document or selects the file or document, the system may then present a warning, which may be a spoken warning and/or a visual warning. Further, the marking of files which have never been executed or opened may be either by visual markings or auditory markings (e.g. a spoken warning). In FIG. 9C, the user, intrigued by the cloud marking, has decided to click on the "!" symbol 931 next to the cautionary marking. This symbol conveys further information to the user 932, including all the metadata known about the file (including its origin), and a choice of future actions 933. In other embodiments of this feature, the exclamation mark may be replaced by other symbols.

Another aspect of the invention involves visually marking the appearance of documents (as opposed to applications) which, if opened, will cause the operating system to select an application which has never been launched before. Hence, the cautionary markings would appear on files that, if opened, would trigger a "first launch" warning as described above. This 'passive' marking technique could be used in conjunction with the first-launch warning, or as an alternative to the first-launch warning. The cautionary marking of documents could also allow active disclosure of information about the potentially unsafe application that will open the document. The main difference with the cautionary marking previously described for unsafe applications is that the marking is now visually attached to all documents associated with the unsafe application, as opposed to being attached only to an unsafe application itself. In some embodiments of the invention, both the unsafe applications and the documents processed by unsafe applications can be marked. The marking may appear constantly or only when a user shows an interest in the application or document, such as when a user positions a cursor over the application or document or selects the application or document.

In another aspect of the invention, the same cautionary marking technique is applied to the display of URLs which, if opened, cause an unsafe application to launch.

Download Warnings

Figure 7A:
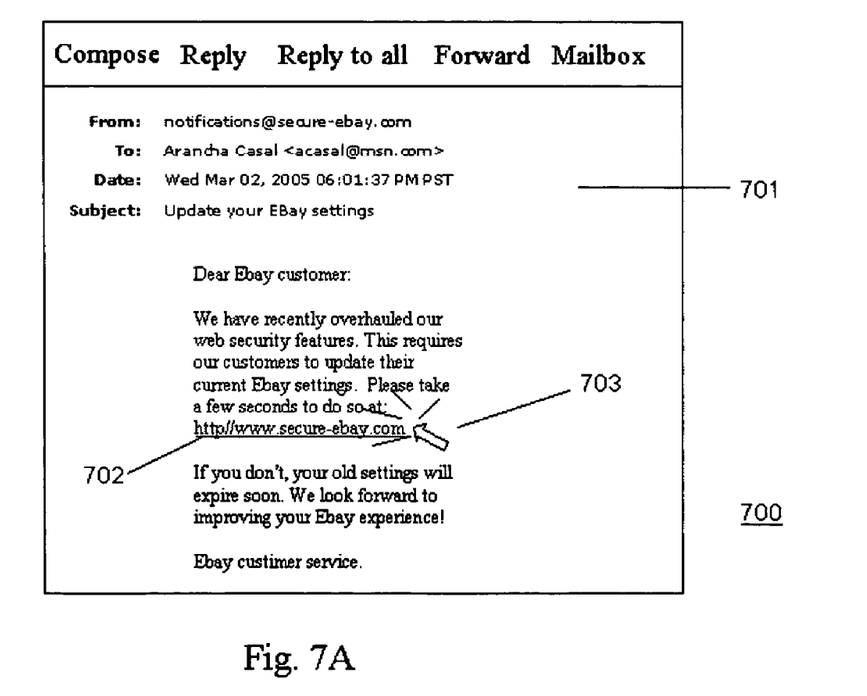
FIGS. 7A-B illustrate an exemplary case where a user clicking on a link in an email triggers a download of an application from the Internet and the user is duly warned.
Figure 7B:
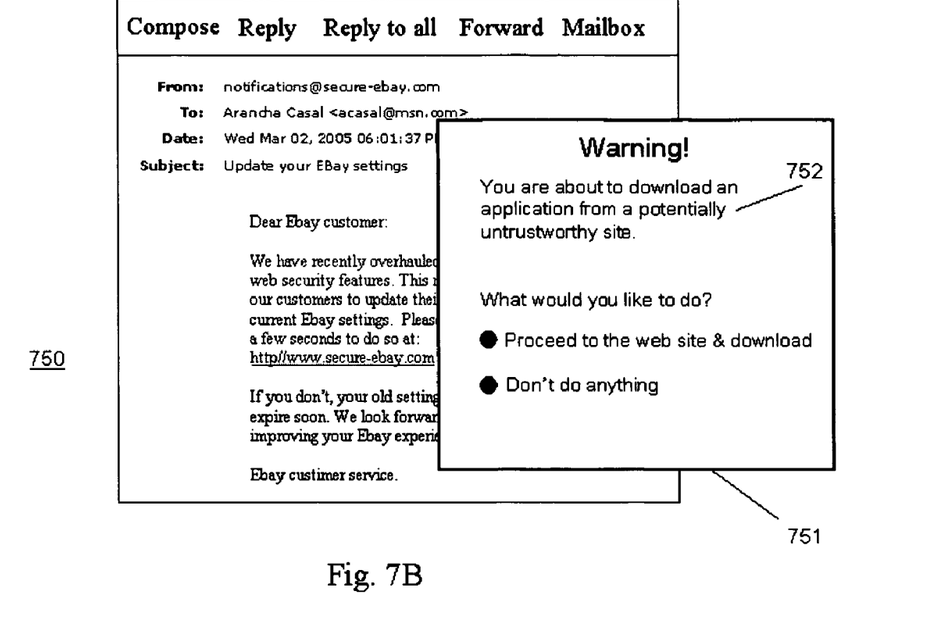

In preferred embodiments of the invention, warnings are also issued when downloading potentially malicious files. FIGS. 7A illustrate an exemplary case where a user double-clicks 703 on a link 702 embedded in an email message 701. The link appears to have a regular URL from a well-known, legitimate Internet business (eBay). However, accessing the URL results in an attempt to download an application to the unsuspecting user's computer. In particularly sophisticated attacks, the malicious application can proceed to automatically launch itself once downloaded. FIG. 7B illustrates a warning displayed to the user 751 when the system detects that an executable program is being downloaded.

In another aspect of the invention, the system may determine that a particular site or domain is unsafe by maintaining a per-user history list of sites or domains previously visited by the user, as, for example, disclosed in co-pending application 04860.P3614 from Apple Computer Inc.

Figure 6:
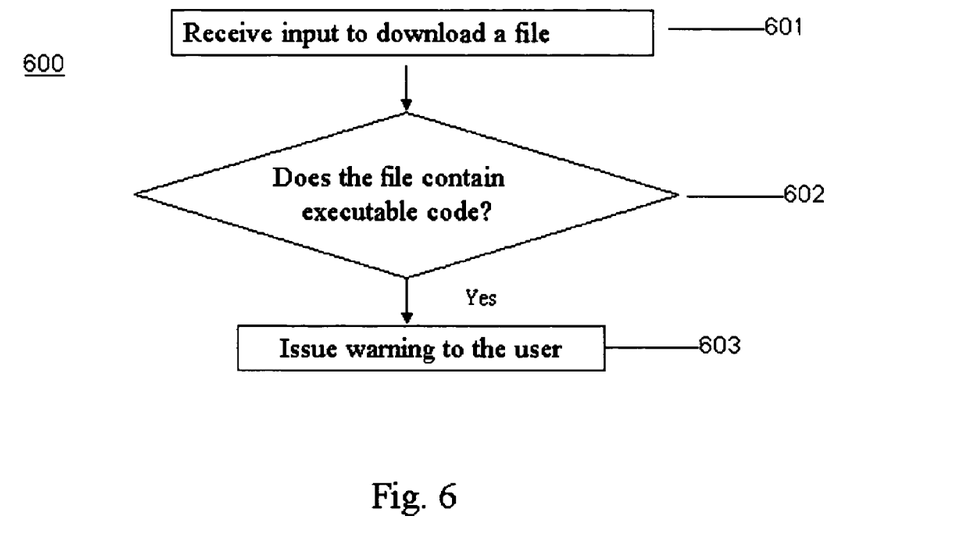
FIG. 6 is a flowchart illustrating a series of possible steps towards issuing a download warning.

FIG. 6 illustrates a sequence of steps involved in issuing a download warning. After the system receives an input to download a file 601, it determines if the file contains executable code 602 and if so, issues a warning to the user 603.

Figure 10:
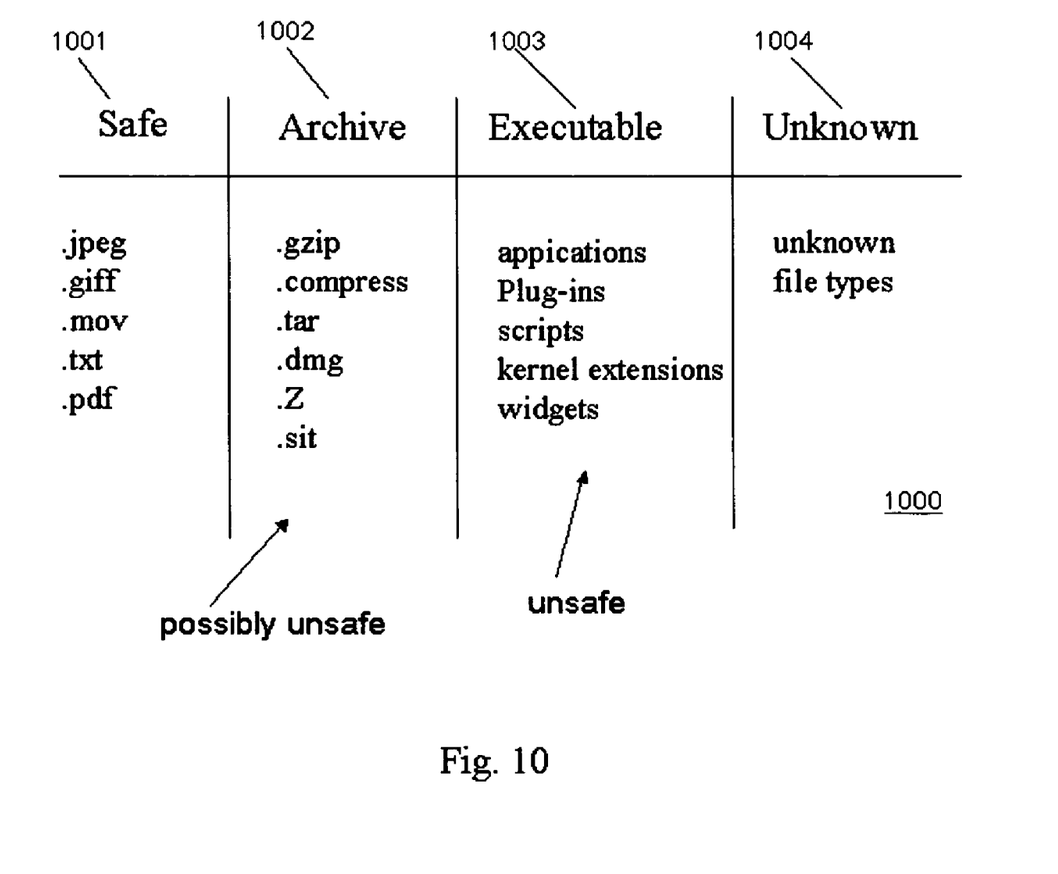
FIG. 10 is a table showing a simple classification scheme that can be applied to files downloaded from the Internet or other untrustworthy sources.

Because it is increasingly commonplace for users to download all sorts of files from the Internet, including applications and other executables, it is important to target only files that may be problematic. In one possible embodiment, a simple classification scheme can be implemented for files downloaded from the Internet, or from other untrustworthy sources. As illustrated in FIG. 10, files can be classified as "safe" 1001 if they are of known types and do not contain executable code (such as jpeg image files, QuickTime movie files or pdf documents, etc); as "archives" 1002 if they are compressed types (such as disk images, compress files, zip files, stuffit files, tar files, etc); as unsafe "executables" 1003 if they contain executable code (such as applications or dynamically loadable libraries), shell scripts, or plug-ins); or as "unknown" 1004 if they are none of the above. Because a malicious program can masquerade as a legitimate file by selecting its appearance and metadata (such as the MIME type, URL, etc.) the classification is preferably done after an analysis of the raw data bits in the downloaded file. By directly analyzing the underlying data, executables can be detected and flagged for warning.

In preferred embodiments, only the executable and archive categories may trigger a download warning. The unknown category may trigger a later first-launch warning if the application selected to process the file is considered unsafe (as described earlier).

Figure 8:
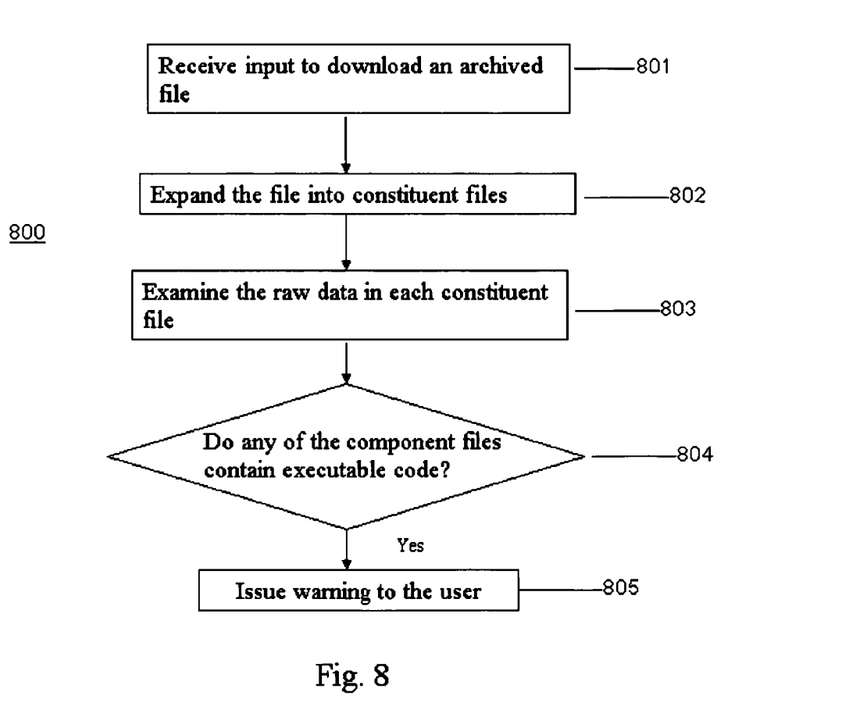
FIG. 8 is a flowchart illustrating a series of possible steps towards issuing a warning when downloading an archived file.

Downloading an archived file can pose a special security challenge, since archived files may contain any type of file. One possible embodiment of the present invention, as illustrated in FIG. 8, determines if the archive contains executable code by first expanding the contents of the archive into its component files 802 and then examining the raw data of each file 803 in turn. In order to prevent the user or other OS programs from accessing the potentially malicious contents, the archive is expanded in a quarantined area of the system, inaccessible to the user and other programs (such as importers or sniffers). If any of the component files are executables 804, the user is duly warned 805.

As was the case with the first-launch warnings discussed above, the user can narrow down the scope of download-related warnings (for example, by disabling warnings for certain trusted Internet sites or domains) at any time, by for example, editing the system or security settings. Similarly, every time a warning is displayed, the option to edit the warnings parameters can be presented to the user.

In the foregoing specification, the invention has been described with reference to specific exemplary embodiments thereof. It will be evident that various modifications may be made thereto without departing from the broader spirit and scope of the invention as set forth in the following claims. The specifications and drawings are, accordingly, to be regarded in an illustrative sense rather than a restrictive sense.

What is claimed is:

1. A machine-implemented method comprising:
   receiving an input by a user to open a file without the user specifying an application to open the file;
   finding an application to open the file;
   verifying, by a data processing system, if the application has been launched before by the user; and
   issuing a warning to the user if the application has never been launched before by the user, wherein the warning includes presenting the user with at least one choice and wherein the warning is issued before launching the application.

2. A method as in claim 1 wherein verifying if the application has been launched before is accomplished by maintaining a per-user storage to keep track of which applications have been run by the user in the past.

3. A method as in claim 1 wherein the warning includes information about the application such as its name and its location in the user's system and wherein further warnings are issued up to an nth time that the application is launched.

4. A method as in claim 1 wherein the at least one choice includes opening the application, canceling the application, or canceling and showing the application's icon and location.

5. A method as in claim 1 further comprising excluding applications that have been pre-installed in the user's system and applications that have been downloaded from a trusted source by the user.

6. A method as in claim 1 wherein the user has the option of restricting the scope of the warning.

7. A machine-implemented method comprising:
  receiving an input to display the contents of part or all of a user's file system; and
  displaying, by a data processing system in response to the input, the contents of part or all of the user's file system on a display device, wherein the displayed contents include a file and wherein an appearance of the file in the displayed contents is marked with a visual indication that indicates to the user that an executable program corresponding to the file has never been launched before by the user.

8. A method as in claim 7 further comprising displaying a marking next to the icons or names of the programs that, when selected, displays further information about the program and wherein the marking makes the appearance recognizably different.

9. A method as in claim 8 wherein the information includes attributes about the program such as its origin, version number, and other metadata and wherein the marking is only in response to at least one of determining that the user has selected the file and the user has positioned a cursor near the file.

10. A method as in claim 9 wherein the attributes and metadata are accessed from at least one of an indexed content database and a metadata database maintained by the file system.

11. A method as in claim 7 further comprising excluding programs that have been pre-installed in the user's system and programs that have been downloaded from a trusted source.

12. A machine-implemented method comprising:
  displaying, by a user's data processing system on a display device, a user's file, wherein an appearance of the displayed file includes a marking that indicates to the user that the file, when opened, launches an executable program that has never been launched before by the user.

13. A method as in claim 12 wherein the marking is displayed next to the icon or name of the file that, when selected, displays further information about the file and wherein the marking makes the appearance recognizably different and wherein the marking is only in response to at least one of determining that the user has selected the file and the user has positioned a cursor near the file.

14. A method as in claim 12 wherein the information includes attributes about the file and the executable program such as its origin, version number, and other metadata.

15. A method as in claim 12 further comprising excluding executable programs that have been pre-installed in the user's system and executable programs that have been downloaded from a trusted source.

16. A machine-implemented method comprising:
  displaying, by a user's data processing system, a graphical representation of a URL on a display device, wherein an appearance of the URL is marked with a visual indication that indicates to a user that activating the URL launches an executable program that has never been launched before by the user.

17. A non-transitory machine readable storage medium storing
  instructions which when executed by a system cause the system to perform a method comprising:
    receiving an input by a user to open a file without the user specifying an application to open the file;
    finding an application to open the file;
    verifying if the application has been launched before by the user; and
    issuing a warning to the user if the application has never been launched before by the user, wherein the warning includes presenting the user with at least one choice and wherein the warning is issued before launching the application.

18. The non-transitory machine readable storage medium as in claim 17 wherein verifying if the application has been launched before is accomplished by maintaining a per-user storage to keep track of which applications have been run by the user in the past.

19. The non-transitory machine readable storage medium as in claim 17 wherein the warning includes information about the application such as its name and its location in the user's system and wherein further warnings are issued up to an nth time that the application is launched.

20. The non-transitory machine readable storage medium as in claim 17 wherein the at least one choice includes opening the application, canceling the application, or canceling and showing the application's icon and location.

21. The non-transitory machine readable storage medium as in claim 17 wherein the input to open a file may come from clicking on a file icon or clicking on a web link in a web page or other electronic document.

22. The non-transitory machine readable storage medium as in claim 17 further comprising excluding applications that have been pre-installed in the user's system and applications that have been downloaded from a trusted source by the user.

23. The non-transitory machine readable storage medium as in claim 17 wherein the executable program originated in the Internet.

24. The non-transitory machine readable storage medium as in claim 17 wherein the user has the option of restricting the scope of the warning.

25. A non-transitory machine readable storage medium storing
  instructions which when executed by a system cause the system to perform a method comprising:
    receiving an input to display the contents of part or all of a user's file system; and
    displaying, in response to the input, the contents of part or all of the user's file system on a display device, wherein the displayed contents include a file and wherein an appearance of the file in the displayed contents is marked with a visual indication that indicates to the user that an executable program corresponding to the file has never been launched before by the user.

26. The non-transitory machine readable storage medium as in claim 25 further comprising displaying a marking next to the icons or names of the programs that, when selected, displays further information about the program and wherein the marking makes the appearance recognizably different.

27. The non-transitory machine readable storage medium as in claim 26 wherein the information includes attributes about the program such as its origin, version number, and other metadata and wherein the marking is only in response to at least one of determining that the user has selected the file and the user has positioned a cursor near the file.

28. The non-transitory machine readable storage medium as in claim 27 wherein the attributes and metadata are accessed from at least one of an indexed content database and a metadata database maintained by the file system.

29. The non-transitory machine readable storage medium as in claim 25 further comprising excluding programs that have been pre-installed in the user's system and programs that have been downloaded from a trusted source.

30. The non-transitory machine readable storage medium as in claim 25 wherein marking the appearance in a unique way may include displaying a distinctive warning symbol adjacent to the icon and name of the program, or other visual markings.

31. A non-transitory machine readable storage medium storing instructions which when executed by a system cause the system to perform a method comprising:
displaying, on a display device, a user's file, wherein an appearance of the displayed file includes a marking that indicates to the user that the file, when opened, launches an executable program that has never been launched before by the user.

32. The non-transitory machine readable storage medium as in claim 31 wherein the marking is displayed next to the icon or name of the file that, when selected, displays further information about the file and wherein the marking makes the appearance recognizably different and wherein the marking is only in response to at least one of determining that the user has selected the file and the user has positioned a cursor near the file.

33. The non-transitory machine readable storage medium as in claim 31 wherein the information includes attributes about the file and the executable program such as its origin, version number, and other metadata.

34. The non-transitory machine readable storage medium as in claim 33 wherein the attributes and metadata are accessed from at least one of an indexed content database and a metadata database maintained by the file system.

35. The non-transitory machine readable storage medium as in claim 31 further comprising excluding executable programs that have been pre-installed in the user's system and executable programs that have been downloaded from a trusted source.

36. A non-transitory machine readable storage medium storing
instructions which when executed by a system cause the system to perform a method comprising:
displaying a graphical representation of a URL on a display device, wherein an appearance of the URL is marked with a visual indication that indicates to a user that activating the URL launches an executable program that has never been launched before by the user.

37. A data processing system comprising:
means for receiving an input by a user to open a file without the user specifying an application to open the file;
means for finding an application to open the file;
means for verifying, by a hardware device, if the application has been launched before by the user; and
means for issuing a warning to the user if the application has never been launched before by the user, wherein the warning includes presenting the user with at least one choice and wherein the warning is issued before launching the application.

38. A system as in claim 37 wherein verifying if the application has been launched before is accomplished by maintaining a per-user storage to keep track of which applications have been run by the user in the past.

39. A system as in claim 37 further comprising excluding applications that have been pre-installed in the user's system and applications that have been downloaded from a trusted source by the user.

* * * * *